United States Patent
Thomas et al.

[19]

[11] Patent Number: 5,857,054
[45] Date of Patent: Jan. 5, 1999

[54] APPARATUS AND METHOD FOR REMOVABLY POSITIONING OPTICAL FIBER TO CIRCUIT BOARD COMPONENT IN ENCLOSURE

[75] Inventors: John C. Thomas, Fargo; John D. Paulson, West Fargo; Jon T. Jacobson, Fargo, all of N. Dak.

[73] Assignee: Phoenix International Corporation, Fargo, N. Dak.

[21] Appl. No.: 844,790

[22] Filed: Apr. 22, 1997

[51] Int. Cl.⁶ ...................................................... G02B 6/00
[52] U.S. Cl. ............................................................. 385/134
[58] Field of Search ..................................... 385/134, 135, 385/136, 147, 88, 89, 93; 359/123, 158, 267, 245; 369/275.3, 44.37, 109, 111, 277, 278

[56] References Cited

U.S. PATENT DOCUMENTS

| | | | |
|---|---|---|---|
| 4,307,934 | 12/1981 | Palmer | 385/88 |
| 4,820,659 | 4/1989 | Dholakia et al. | 438/26 |
| 5,032,898 | 7/1991 | Bowen et al. | 257/433 |
| 5,066,112 | 11/1991 | Lynam et al. | 359/267 |
| 5,488,705 | 1/1996 | LaBarbera | 359/115 |
| 5,617,233 | 4/1997 | Boncek | 359/123 |

*Primary Examiner*—Akm E. Ullah
*Attorney, Agent, or Firm*—Arnold International; Bruce Y. Arnold

[57] ABSTRACT

An apparatus and method for removably attaching one or more optical fibers so as to be in alignment with a respective electro-optic component on a circuit board within an enclosure. In a first embodiment, the header attaches to an aperture of an enclosure, thereby protecting the circuit board from dust and liquids. In a second embodiment, the header and protective enclosure are one integral unit. The invention enables one or more optical fibers to be detachably attached to a first side of a header or header/enclosure, and for a circuit board having one or more electro-optic components precisely positioned thereon to be attached to the other side thereof and accessed by the attached fiber by a through-hole in the header. A ferrule surrounds at least one optical fiber near an end thereof and includes a seating surface which seats on the exterior side of the header or header/enclosure. When two optical fibers having free ends of different length are carried by the connector, ferrules attached to each connector enable the optical fiber ends to be accurately positioned at different heights above respective electro-optic components on the circuit board.

19 Claims, 6 Drawing Sheets

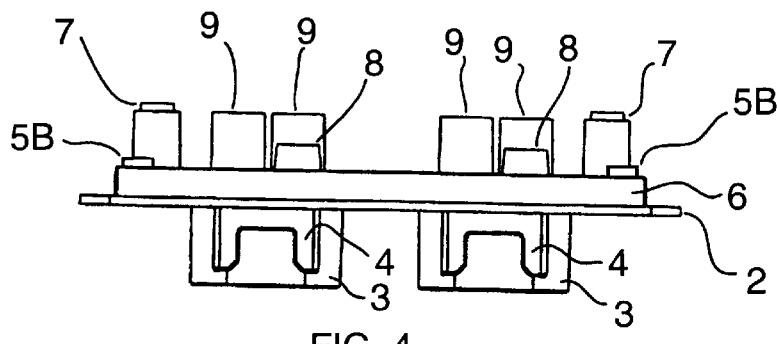
FIG. 4
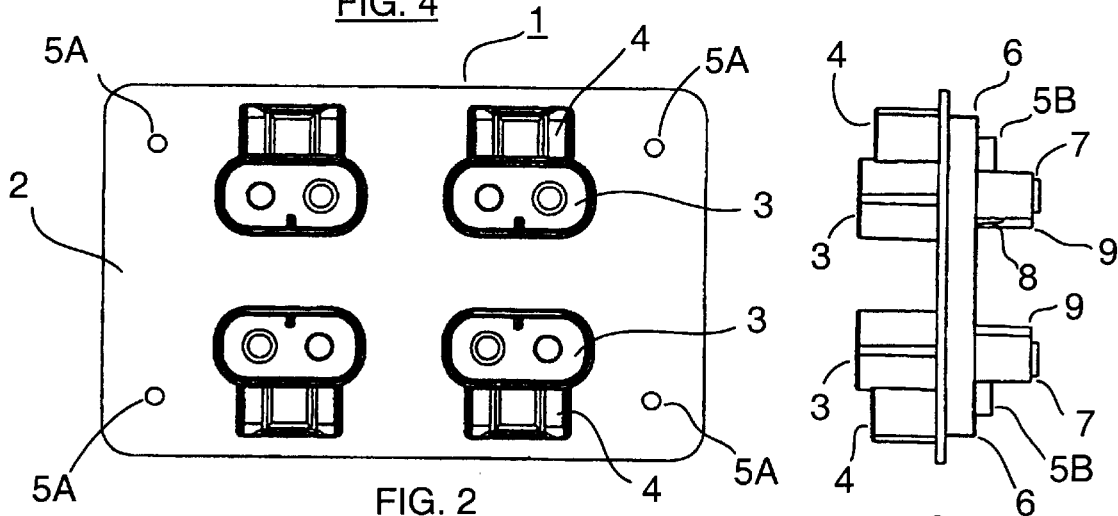
FIG. 2
FIG. 5
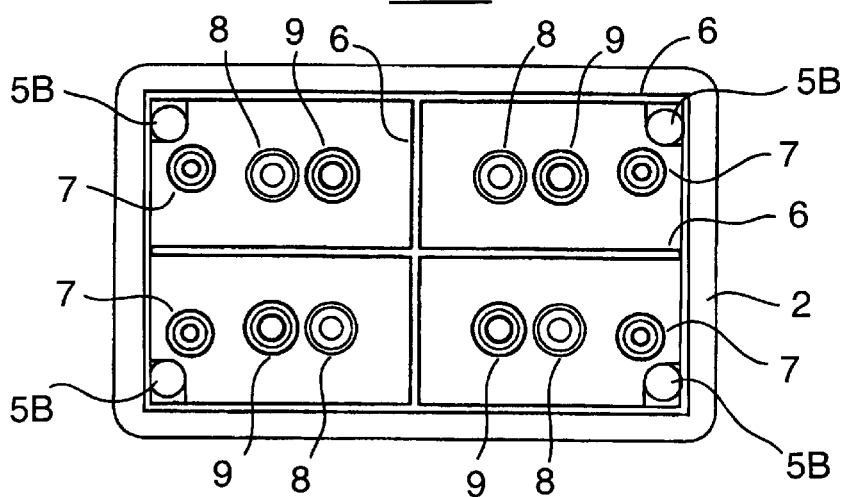
FIG. 3

APPARATUS AND METHOD FOR REMOVABLY POSITIONING OPTICAL FIBER TO CIRCUIT BOARD COMPONENT IN ENCLOSURE

BACKGROUND OF THE INVENTION

There presently is an unsolved need for an apparatus and a method which enables an optical fiber to be readily positioned relative to an electro-optic component on a circuit board contained within an enclosure for optical communication therewith, and which allows the optical fiber to be easily connected to, and disconnected from, the apparatus. Further, there is a need for an apparatus and method that enables multiple optical fibers to be easily aligned and connected for optical communication with respective electro-optic components on a circuit board, and which enables the ends of the optical fibers to be positioned at different heights above the circuit board so as to accommodate different sizes of electro-optic components on the circuit board and to optimize radiation coupling between the optical fiber and the respective electro-optic component.

SUMMARY OF THE INVENTION

A first object of the invention is to provide a method and apparatus which enables an optical fiber to be attached to, and unattached from, an enclosure containing a circuit board in a manner that permits an end of the optical fiber to be accurately positioned in three dimensions relative to a respective electro-optic component on the circuit board. A second object of the invention is to enable ends of two or more optical fibers that each communicate with a respective electro-optic component on the circuit board to be accurately positioned at different heights above the circuit board in order to accommodate differently-sized electro-optic components on the circuit board and/or to achieve optimal radiation coupling. A third object of the invention is to provide a structure which forms a sealed enclosure that is nearly impervious to dust and liquids and which enables one or more optical fibers to be conveniently connected so as communicate with respective electro-optic components mounted on a circuit board within the enclosure, or conveniently disconnected from the enclosure. Other objects and additional scope of applicability will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given below and the accompanying drawings which are given by way of illustration only, and thus, are not limitative of the present invention, wherein:

FIG. 2 is a front view of the header of FIG. 1, showing the side of the header to which pairs of optical fibers can be removably attached;

FIG. 3 is a back view of the header of FIG. 1, showing the side of the header to which a circuit board may be attached;

FIG. 4 is a top view of the header shown in FIG. 1;

FIG. 5 is a right side view of the header shown in FIG. 1;

DETAILED DESCRIPTION OF THE PREFERRED EMBODIMENTS

Figure 1:
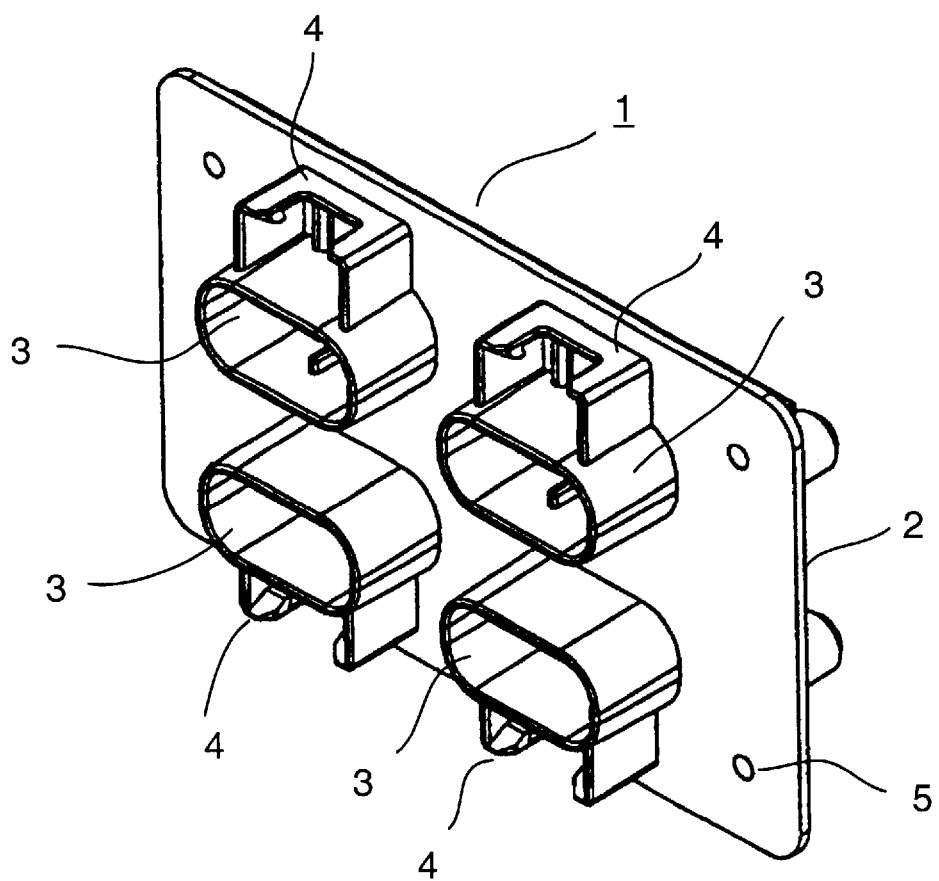
FIG. 1 is a perspective view of a header according to a first embodiment of the present invention, useful for connecting four pairs of optical fibers (not shown) to a circuit board (not shown)

Referring now to FIG. 1 of the drawings, the header 1 of a preferred embodiment of the invention is illustrated. A plate 2 has, on one surface thereof, four connector interfaces 3, each of which has a catch 4 for removably attaching one or more optical fibers by use of a connector (not illustrated) having a latch which engages the catch 4. In the preferred embodiments, the header 1 is integrally formed of an injection-molded plastic material.

As best seen in FIG. 2, indentations 5A are provided in the plate 2 of the header for receiving screws or other fasteners for attaching the header 1 within an aperture of an enclosure (not illustrated).

As shown in FIG. 3, ribs 6 are provided to add structural strength to the plate 2. Also visible in FIG. 3 are columns 5B, standoff supports 7, detector interfaces 8 and LED interfaces 9. These components will be discussed in more detail below.

As better illustrated in FIGS. 4 and 5, showing the back and right-side views of the header of FIG. 1, standoff supports 7 have a reduced diameter at their free ends for supporting a circuit board at a precise position in three dimensions. Also visible in FIGS. 4 and 5 are columns 5B, opposite the indentations 5A (FIG. 2), each for receiving a fastener such as a screw to affix the header to an enclosure. Detector interfaces 8 and LED interfaces 9 are visible in this drawing figure as well, but these components will be discussed in more detail below.

FIG. 5 is a right side view of the header shown in FIG. 1.

Figure 6:
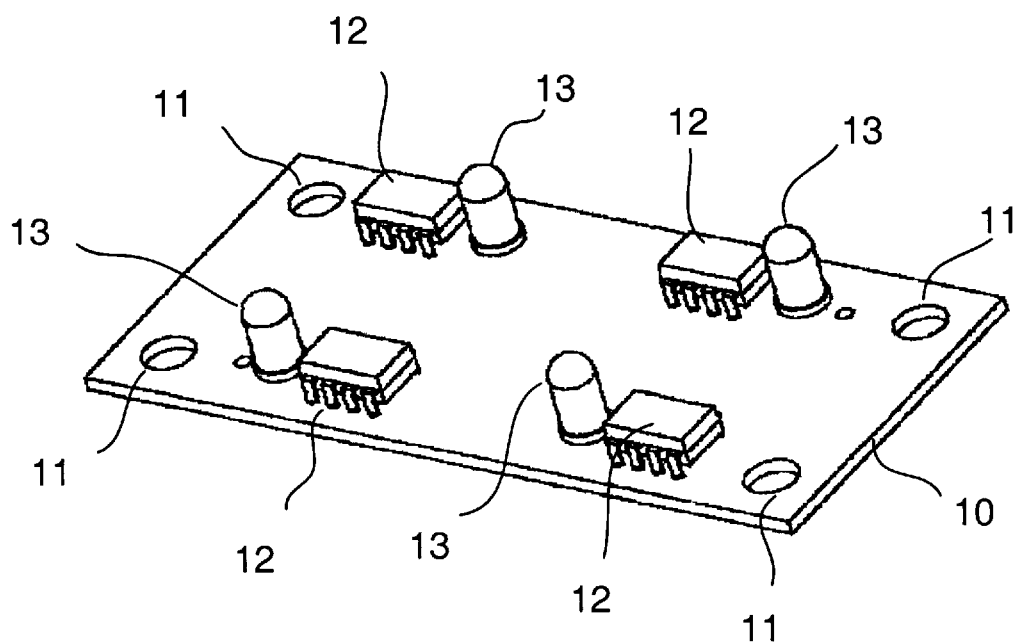
FIG. 6 is a perspective view of a circuit board having four pairs of electro-optic components mounted thereon, for attachment to the header of FIG. 1.

FIG. 6 illustrates a circuit board 10 having electro-optic components precisely positioned and mounted thereon and also having precisely positioned mounting holes 11 therein. In the preferred embodiment, circuit board 10 is a printed circuit board. The mounting holes 11 allow the circuit board 10 to fit snugly onto the reduced diameter ends of standoff supports 7 (see FIGS. 4 and 5). Various techniques may be used to affix the circuit board 10 to the standoff supports 7, such as "snap fit", ultrasonic weld, or fasteners such as screws (not shown). The use of different electro-optic components on the circuit board 10 may require that the ends of different optical fibers be mounted at different distances from the top surface of the circuit board. For example, detectors 12 may be commercially available detectors (which output a pulse-width modulated signal proportional to the intensity of light detected) which are shorter than LED's 13. In addition, even for similarly-sized components that are different in function, it may be desirable to position the optical fiber ends so as to be at different heights relative thereto for optimal radiation transfer into or out of the optical fibers.

Figure 7:
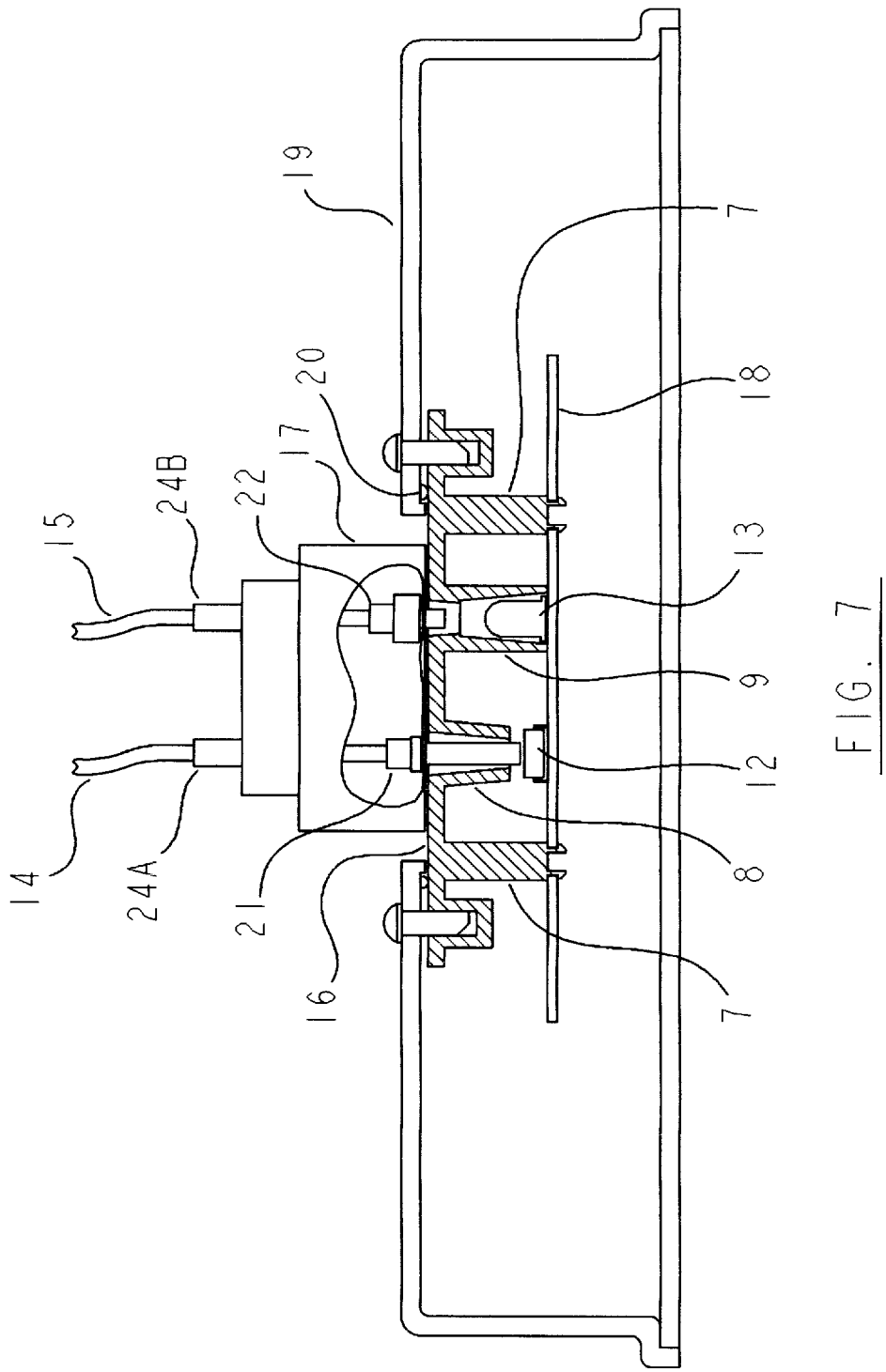
FIG. 7 is a view showing a minor variation of the first embodiment of the invention having a separate header designed for connecting a single pair of optical fibers via a connector so as to optically communicate with respective electro-optic components attached to a circuit board within an enclosure. Also illustrated in FIG. 7 are a circuit board and connector, with each attached to opposite sides of the header so as to accurately position optical fiber ends at fixed locations relative to the attached circuit board and at different distances from the circuit board.

FIG. 7 illustrates a minor variation of the first preferred embodiment of the invention, useful for connecting just one pair of optical fibers 14,15 to the header 16. The pair of fibers 14, 15 are removably attachable to the header 16 by a connector 17 so as to communicate with two different respective electro-optic components on circuit board 18. The optical fibers 14, 15 are plastic, single cable, multi-mode optical fibers. Plastic optical fibers are preferred over glass optical fibers because of a number of advantages, including high flexibility, easy cutting and termination, and low cost. Single cable optical fibers have been selected over optical fiber bundles for simplicity and low cost reasons. A typical optical fiber of the type described herein will include a core region, a cladding region surrounding the core region, and an outer jacket material. The cladding region has a slightly lower index of refraction than the core region. Light rays that are emitted into the core region at or below a maximum angle are substantially reflected at the core/cladding barrier so as to propagate down the optical fiber. In one specific embodiment, the plastic material of the core and cladding region is polymethyl methacrylate (PMMA) and the outer jacket material is black polyethylene. Optical fibers of this type are available from AMP, Inc., Harrisburg, Pa. as part nos. 501232-5 and 501336-1. However, as will be appreciated by one skilled in the art, different plastics or glass could be used for the optical fibers without departing from the scope of the invention.

The connector 17 is removably attached to one side of the header 16 (i.e., using a latch and catch as in FIG. 1 that affixes the connector to a connector interface, not shown). The circuit board 18 is positioned and affixed to the other side of the header 16 using standoff supports 7. Once again, the circuit board 18 may be affixed to the standoff supports 7 by any of various techniques, such as "snap-fit", ultrasonic weld, or by fasteners such as screws. Detector interface 8 serves to align the end of receiver optical fiber 14 so that its center is perpendicular to the center of a through-hole in the top surface of header 16. LED interface 9 serves both to position the optical fiber end so as to be in line with a different through-hole in the top surface of the header 16 and to shield stray light emitted from LED 13 from affecting light-sensitive components on the circuit board, such as detector 12. Also attached to the header 16 is an enclosure 19 which encloses the circuit board 18 and forms a dust and liquid resistant environment by means of a gasket or sealing member 20. Although a liquid and dust resistant enclosure 19 having a back cover plate is illustrated in FIG. 7, the enclosure for this embodiment of the invention may optionally be formed without the cover plate. However, the cover plate is preferred because it provides better access for mounting the components than an enclosure with a single aperture.

For clarity, the portion of the header 1 corresponding to connector interface 3 with catch 4 illustrated in FIG. 1 has been omitted from FIG. 7. Also, a portion of the connector 17 which fits into the connector interface 3 has been cut-away (as illustrated in FIG. 7 by a dashed line) in order to illustrate the manner in which the pair of optical fibers are attached to the connector, and to illustrate how the optical fiber ends may be positioned at different distances from the circuit board 18 or from components connected to the circuit board. Receiver fiber ferrule 21 and emitter fiber ferrule 22 each have a longitudinal seating surface at the lower side of an increased diameter portion of the ferrule. Each ferrule also has a longitudinal through-hole comparable in diameter to that of the optical fiber. The ferrules 21 and 22 are slipped over the ends of the respective optical fiber and the top portion of each ferrule, above the portion of increased diameter, is crimped to the optical fiber using a crimp collar which compresses the ferrule against the respective optical fiber. Ends of the respective receiver optical fiber 14 and emitter optical fiber 15 may be positioned at different predetermined distances from the seating surface of the respective ferrule. When removably attached by the connector 17 to the header 16, the seating surface of at least one ferrule seats on a component of the connector that abuts the outer surface of the header 16 so as to position the end of the optical fiber at a given height above the top surface of a circuit board 18. This enables the ends of two optical fibers to be positioned at different heights to accommodate differently sized electro-optic components attached to circuit board 18, such as detector 12 or LED 13. Even for similarly-sized electro-optic components, the function of the components may demand that the optical fiber ends be at different distances from the component in order to achieve optimum radiation coupling with the associated optical fiber.

Figure 8:
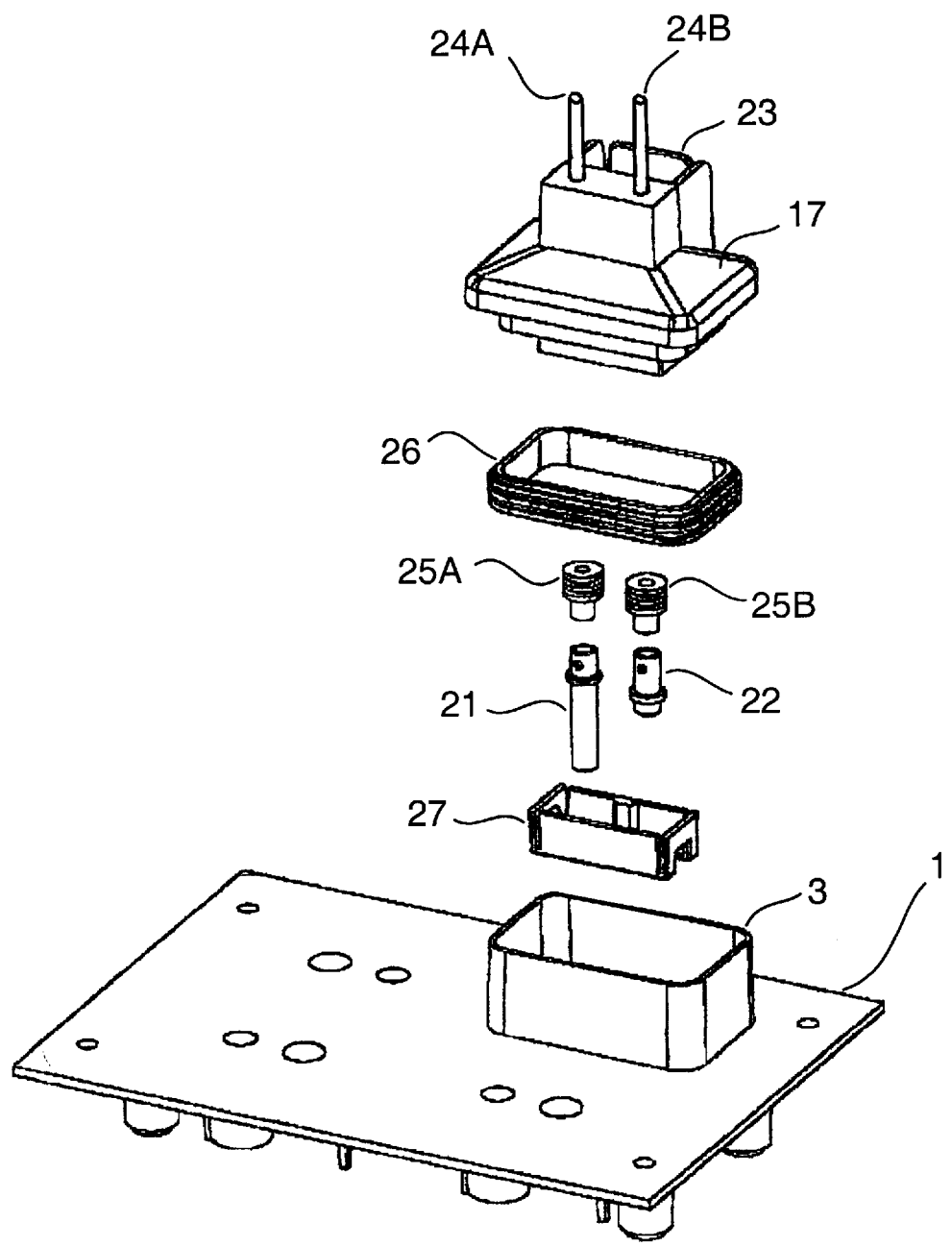
FIG. 8 illustrates, in exploded view, the components of a preferred embodiment of a connector of the present invention and how these components are assembled and attached to a connector interface. Only the single connector interface associated with the illustrated connector is shown in FIG. 8, for clarity of illustration; and, FIG. 9 illustrates a second embodiment of the invention which employs an alternative structure to that illustrated in FIG. 7.

FIG. 8 illustrates, in exploded view, the connector 17 as well as other components within the connector which serve to affix and seal optical fibers (not shown) to the connector 17, and the relationship of the connector 17 to an associated connector interface 3. In FIG. 8, only one connector interface and connector are shown, for clarity of illustration. Connector 17 has a cantilevered, flexible latch 23 for removably connecting the connector to the catch (not visible) of connector interface 3. Also, it has two optical fiber supports 24A, 24B, through which a respective optical fiber is inserted. In the preferred embodiment, the connector, latch and supports are integrally formed of a hard but somewhat flexible plastic material. When the connector 17 is attached to the connector interface 3, an outer perimeter of the connector 17 fits around the connector interface 3. Although not clearly illustrated, there is a smaller-sized portion of the connector 17 that is shaped similarly to connector interface 3 and lies within the outer perimeter of the connector. A connector seal 26, having several sealing ridges and formed of soft plastic material, fits around this smaller-sized portion. When the connector 17 is attached to the connector interface 3, the connector seal 26 is compressed and seals the connector 17 to the connector interface 3. Further, after passing through a respective optical fiber support 24A, 24B, each optical fiber passes through a respective cylindrical region (not visible in the figure) that is co-linear with the respective optical fiber support 24A, 24B and has an enlarged diameter as compared thereto. To form a dust and liquid resistant seal between the axial opening and each optical fiber, the optical fiber is threaded through a respective optical fiber seal 25A, 25B, each having several sealing ridges formed of a soft plastic material. The optical fiber is next threaded through a crimp collar (not shown) and then through the through-hole of a respective ferrule a specified distance. Ferrules 21 and 22 each have a facing surface beneath a larger diameter part of the ferrule. After the crimp collars have been crimped to attach the ferrules to the optical fibers, ends of the optical fibers with attached ferrules are inserted up to the facing surface of each ferrule into respective through-holes (not visible) in nose piece 27. Nose piece 27 is then attached to the connector by snapping it in place beneath seal 26. When the connector 17 is latched to the connector interface 3, the optical fiber seals 25A, 25B, and the connector seal 26 are compressed and the nose piece 27 is biased against the exterior surface of header 16 (FIG. 7).

Different methods are known in the art for terminating plastic optical fibers of the type described herein. A known hot-plate method was selected as one suitable choice for terminating the optical fiber. The hot-plate technique melts and forms a polished face at the tip of the optical fiber so as to have an optically smooth surface finish perpendicular to the optical axis of the optical fiber.

Figure 9:
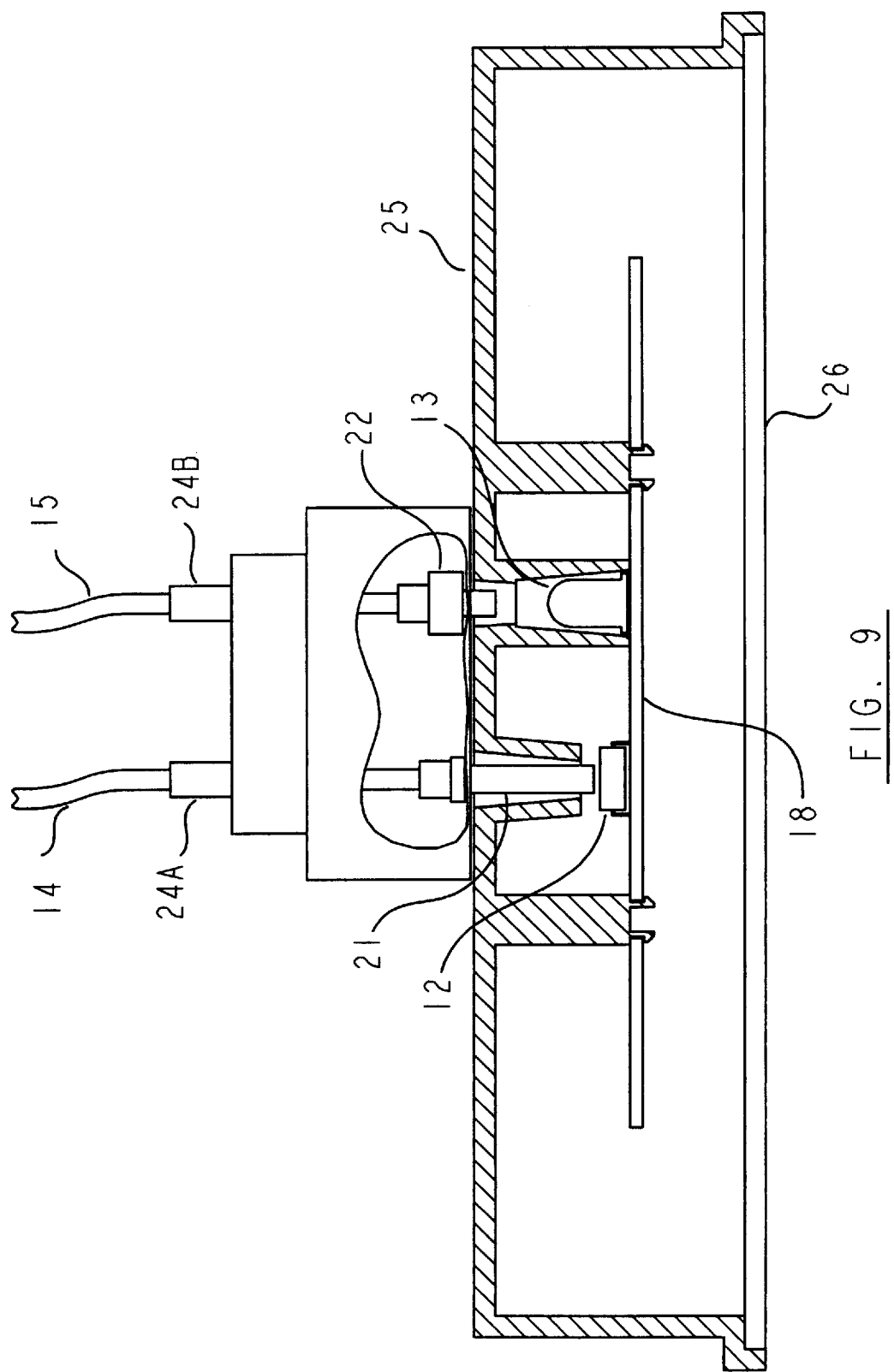
In FIG. 9, the header and protective enclosure are formed as one integral unit. This embodiment requires that there be separate access to the enclosure.

In FIG. 9, a second embodiment of the invention is illustrated. Rather than there being a separate header 16 that is affixed to an aperture of an enclosure 19, as in FIG. 7, in this embodiment the header and enclosure are one integral unit. For access of and to the circuit board, an enclosure access cover 26 is provided. Enclosure access cover 26 is affixed by fasteners (not illustrated) and is sealed to enclosure 25 by either a gasket or sealing agent (not illustrated) in order to make the enclosure resistant to intrusion by dust and liquids.

A method according to the present invention includes the steps of providing a header or integral header/enclosure having a through-hole, the header being attachable to an enclosure, the header or integral header/enclosure further including means to support a circuit board in three dimensions at a predetermined alignment; attaching a circuit board to the header or header/enclosure, the circuit board having an electro-optic component affixed thereto in a predetermined position; and, attaching a connector carrying an optical fiber to the header or header/enclosure such that the optical fiber extends into the through-hole a predetermined distance, thereby positioning an end of the optical fiber at a specified position above said electro-optic component on the circuit board.

The invention being thus described, it is obvious that the invention may be varied in many ways. For example, the header or header/enclosure of the present invention may be readily modified to accept a different number of optical connectors than specifically illustrated, and the optical connectors may be readily modified to carry different numbers of optical fibers than illustrated in the above specific examples. Other modifications or additions, such as using plugs to seal the connector interfaces 3 when not in use, and/or extending the detector interfaces 8 downward with a transparent window inserted beneath the end of the optical fiber in each of the detector and emitter interfaces to achieve a permanent seal against liquids and dust entering the enclosure, are not to be regarded as a departure from the spirit and scope of the invention, and all such modifications as would be obvious to one skilled in the art are intended to be included within the scope of the following claims.

What is claimed is:

1. A header, for use in covering an aperture of an enclosure, for use in positioning and supporting a circuit board within the enclosure, and for use in positioning and removably attaching an optical connector to the header, said header enabling the accurate positioning of an end of an optical fiber to a respective electro-optic component positioned on the circuit board, said header comprising:

a plate having first and second sides, said plate including a connector interface means, extending from said first side, for positioning and supporting an optical connector with an attached optical fiber in at least two dimensions; and support means, extending from said second side, for positioning and supporting a circuit board having an electro-optic component positioned thereon.

2. The apparatus of claim 1, the first side of said plate including a planar area surrounding a through-hole.

3. The apparatus of claim 2, the header being integrally formed of an injection-molded plastic material.

4. The apparatus of claim 3, the connector interface means including means for removably attaching a connector carrying an optical fiber to the header.

5. The apparatus of claim 4, and further including a circuit board attached to said support means.

6. The apparatus of claim 5, and further including an enclosure resistant to dust and liquid attached to said header so as to encompass said circuit board.

7. The apparatus of claim 1, and further including a circuit board attached to said support means.

8. The apparatus of claim 7, and further including an enclosure resistant to dust and liquid attached to said header so as to encompass said circuit board.

9. The apparatus of claim 8, said plate including a through-hole, said apparatus further including an optical connector means, removably attached to said header, for connecting an optical fiber to said header at said through-hole so as to communicate with an electro-optic component attached to said circuit board.

10. The apparatus of claim 1, said plate including one or more through-holes, said apparatus further including an optical connector means, capable of being precisely positioned and supported by said connector interface means, for connecting one or more optical fibers to said header at said through-holes.

11. The apparatus of claim 10, said optical connector means removably connecting an emitter optical fiber and a receiver optical fiber to said header.

12. The apparatus of claim 10, said plate including two or more through-holes, said optical connector means having two or more optical fibers attached so that ends of the optical fibers extend at two or more different distances from the optical connector.

13. A header, either formed integral with an enclosure or for use in covering an aperture of an enclosure, and for use in positioning and removably attaching an optical connector to the header, said header enabling the accurate positioning of an end of an optical fiber in three dimensions relative to a respective electro-optic component positioned by the circuit board, said header comprising:

a plate having first and second sides, said plate including a connector interface means, extending from said first side, for positioning and supporting an optical connector with an attached optical fiber in at least two dimensions; and support means, extending from said second side, for positioning and supporting a circuit board having an electro-optic component positioned thereon.

14. The apparatus of claim 13, the connector interface means including means for removably attaching a connector carrying an optical fiber to the header.

15. The apparatus of claim 13, and further including a circuit board attached so said support means.

16. The apparatus of claim 13, said plate including a through-hole, said apparatus further including an optical connector means, removably attached to said header, for connecting an optical fiber to said header so as to communicate with an electro-optic component attached to said circuit board.

17. The apparatus of claim 13, said plate including at least two through-holes, said optical connector means having at least two optical fibers attached so that ends of the optical fibers extend at different distances from the optical connector.

18. A method of attaching an optical fiber so as to communicate with a respective electro-optic component on a circuit board within an enclosure, said method comprising the following steps, not necessarily in the order listed:

provalid a header or header/enclosure having a through-hole, said header being attachable to an enclosure resistant to dust and liquid, said header or header/enclosure further including means to support a circuit board in three dimensions at a predetermined alignment;

attaching a circuit board to said header or header/enclosure, said circuit board having an electro-optic component affixed on a surface thereof in a predetermined position;

attaching a connector carrying an optical fiber to said header or header/enclosure so that the optical fiber extends into the through-hole a predetermined distance, thereby positioning an end of the optical fiber at a specified position above said electro-optic component on the circuit board.

19. The method of claim 18, wherein the header or header/enclosure has at least two through-holes, said connector carrying at least two optical fibers having ends which extend different distances beyond the connector so that, when the connector is mounted to the header or header/enclosure, the optical fibers enter a respective through-hole and terminate at different heights above the circuit board.

\* \* \* \* \*